(12) United States Patent
Namburu et al.

(10) Patent No.: US 11,738,410 B2
(45) Date of Patent: Aug. 29, 2023

(54) BRAZED ELECTRODE FOR PLASMA CUTTING TORCH

(71) Applicant: Lincoln Global, Inc., Santa Fe Springs, CA (US)

(72) Inventors: Praveen K. Namburu, Little Elm, TX (US); William T. Matthews, Chesterland, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 741 days.

(21) Appl. No.: 16/704,033

(22) Filed: Dec. 5, 2019

(65) Prior Publication Data

US 2020/0108469 A1    Apr. 9, 2020

Related U.S. Application Data

(63) Continuation of application No. 15/442,424, filed on Feb. 24, 2017, now Pat. No. 10,639,748.

(51) Int. Cl.
| | |
|---|---|
| *B23K 35/22* | (2006.01) |
| *B23K 35/02* | (2006.01) |
| *H05H 1/34* | (2006.01) |
| *B23K 35/30* | (2006.01) |
| *B23K 35/40* | (2006.01) |
| *B23K 1/00* | (2006.01) |
| *B23K 10/02* | (2006.01) |

(52) U.S. Cl.
CPC ............ *B23K 35/22* (2013.01); *B23K 1/0008* (2013.01); *B23K 10/02* (2013.01); *B23K 35/0211* (2013.01); *B23K 35/0216* (2013.01); *B23K 35/302* (2013.01); *B23K 35/3006* (2013.01); *B23K 35/40* (2013.01); *H05H 1/34* (2013.01); *H05H 1/3442* (2021.05); *H05H 1/3478* (2021.05)

(58) Field of Classification Search
CPC ....................................................... B23K 35/22
USPC .................................................... 219/121.52
See application file for complete search history.

(56) References Cited

U.S. PATENT DOCUMENTS

| | | |
|---|---|---|
| 4,967,055 A | 10/1990 | Raney et al. |
| 5,023,425 A | 6/1991 | Severance, Jr. |
| 5,097,111 A * | 3/1992 | Severance, Jr. .......... H05H 1/34 219/121.48 |
| 5,451,739 A | 9/1995 | Nemchinsky et al. |
| 5,464,962 A | 11/1995 | Luo et al. |
| 5,695,662 A | 12/1997 | Couch, Jr. et al. |
| 5,747,767 A | 5/1998 | Severance et al. |
| 5,756,959 A | 5/1998 | Freeman et al. |
| 5,767,478 A | 6/1998 | Walters |

(Continued)

FOREIGN PATENT DOCUMENTS

| | | |
|---|---|---|
| CN | 1493430 A | 5/2004 |
| CN | 205464763 U | 8/2016 |

(Continued)

*Primary Examiner* — Nathaniel E Wiehe
*Assistant Examiner* — Spencer H. Kirkwood
(74) *Attorney, Agent, or Firm* — Brad C. Spencer

(57) ABSTRACT

A silver-copper cutting electrode assembly, and method of manufacture is provided with optimized attributes to allow for improved durability, integrity and manufacturability. An electrode has a silver tip portion which is brazed to a copper body portion where the silver portion and joint have a particular structural relationship.

18 Claims, 4 Drawing Sheets

(56) References Cited

U.S. PATENT DOCUMENTS

| | | | |
|---|---|---|---|
| 5,841,095 A | 11/1998 | Lu et al. | |
| 5,886,315 A | 3/1999 | Lu et al. | |
| 5,977,510 A | 11/1999 | Lindsay | |
| 5,994,663 A | 11/1999 | Lu | |
| 6,020,572 A | 2/2000 | Marner et al. | |
| 6,066,827 A | 5/2000 | Nemchinsky | |
| 6,084,199 A | 7/2000 | Lindsay et al. | |
| 6,130,399 A | 10/2000 | Lu et al. | |
| 6,177,647 B1 | 1/2001 | Zapletal | |
| 6,329,627 B1 | 12/2001 | Walters | |
| 6,403,915 B1 | 6/2002 | Cook et al. | |
| 6,423,922 B1 | 7/2002 | Nemchinsky | |
| 6,424,082 B1 | 7/2002 | Hackett et al. | |
| 6,452,130 B1* | 9/2002 | Qian | H05H 1/34 219/121.52 |
| 6,483,070 B1 | 11/2002 | Diehl et al. | |
| 6,686,559 B1 | 2/2004 | Walters | |
| 6,841,754 B2 | 1/2005 | Cook et al. | |
| 6,946,617 B2 | 9/2005 | Brandt et al. | |
| 6,969,819 B1 | 11/2005 | Griffin | |
| 7,081,597 B2 | 7/2006 | Severance, Jr. | |
| 7,256,366 B2 | 8/2007 | Severance, Jr. | |
| 7,375,302 B2 | 5/2008 | Twarog et al. | |
| 7,375,303 B2 | 5/2008 | Twarog | |
| 7,435,925 B2 | 10/2008 | Griffin | |
| 7,598,473 B2 | 10/2009 | Cook et al. | |
| 7,659,488 B2 | 2/2010 | Cook et al. | |
| 7,754,993 B2 | 7/2010 | Ortega | |
| 7,989,727 B2 | 8/2011 | Twarog et al. | |
| 8,035,055 B2 | 10/2011 | Twarog et al. | |
| 8,097,828 B2 | 1/2012 | Roberts et al. | |
| D654,104 S | 2/2012 | Fitzpatrick et al. | |
| 8,212,173 B2 | 7/2012 | Liebold et al. | |
| 8,338,740 B2 | 12/2012 | Liebold et al. | |
| 8,389,887 B2 | 3/2013 | Liebold et al. | |
| 8,455,786 B2* | 6/2013 | Fang | B23K 10/00 219/121.48 |
| 8,525,069 B1 | 9/2013 | Mather et al. | |
| D692,402 S | 10/2013 | Dalton et al. | |
| 8,546,719 B2 | 10/2013 | Warren, Jr. et al. | |
| 8,633,417 B2 | 1/2014 | Ashtekar et al. | |
| 8,698,036 B1 | 4/2014 | Zhang et al. | |
| 8,772,667 B2 | 7/2014 | Yang et al. | |
| 8,829,385 B2 | 9/2014 | Yang et al. | |
| 2002/0125224 A1* | 9/2002 | Cook | B23K 35/0216 219/121.36 |
| 2002/0179578 A1 | 12/2002 | McBennett | |
| 2002/0185475 A1 | 12/2002 | Horner-Richardson et al. | |
| 2004/0169018 A1 | 9/2004 | Brasseur et al. | |
| 2006/0163216 A1 | 7/2006 | Brandt et al. | |
| 2007/0125755 A1 | 6/2007 | Mather et al. | |
| 2009/0126921 A1* | 5/2009 | Berges | B23K 1/203 165/177 |
| 2011/0240609 A1 | 10/2011 | Jehnert et al. | |
| 2012/0012560 A1 | 1/2012 | Roberts et al. | |
| 2012/0222840 A1 | 9/2012 | Huang | |
| 2013/0043224 A1 | 2/2013 | Leiteritz et al. | |
| 2014/0021175 A1 | 1/2014 | Chen et al. | |
| 2014/0048587 A1 | 2/2014 | Rivest et al. | |
| 2014/0110382 A1 | 4/2014 | Beliveau et al. | |
| 2015/0110548 A1 | 4/2015 | Reid | |
| 2018/0243864 A1 | 8/2018 | Namburu et al. | |

FOREIGN PATENT DOCUMENTS

| | | |
|---|---|---|
| DE | 10 2004 049 445 A1 | 4/2006 |
| DE | 20 2006 018 163 U1 | 3/2007 |
| EP | 0 729 805 A1 | 9/1996 |
| EP | 0 790 756 A2 | 8/1997 |
| EP | 1 369 000 A2 | 12/2003 |
| WO | 99/53734 A1 | 10/1999 |
| WO | 00/28794 A1 | 5/2000 |
| WO | 2006/113737 A2 | 10/2006 |
| WO | 2008/101226 A1 | 8/2008 |
| WO | 2010/111695 A1 | 9/2010 |
| WO | 2012/118826 A1 | 9/2012 |
| WO | 2014/014551 A2 | 1/2014 |
| WO | 2014/187438 A1 | 11/2014 |

* cited by examiner

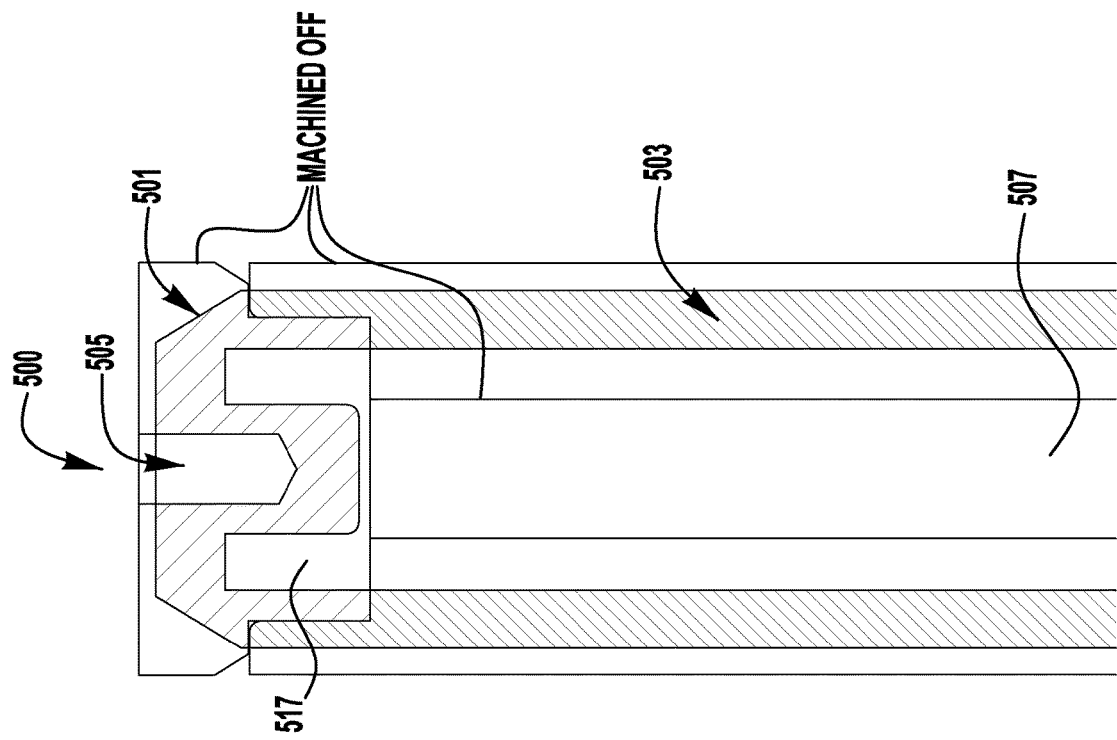
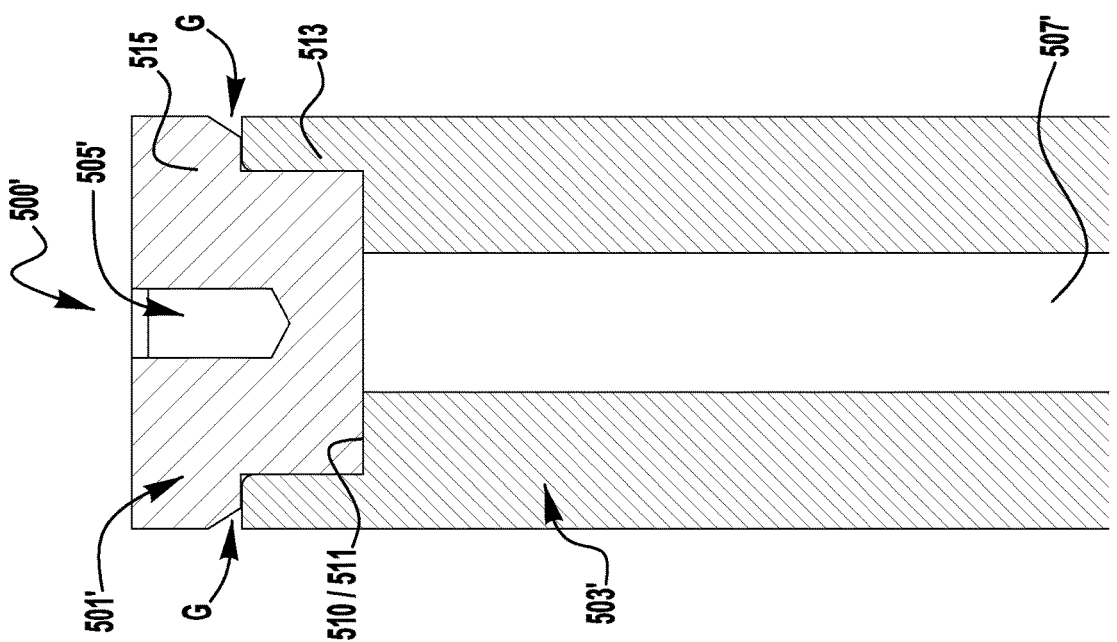

BRAZED ELECTRODE FOR PLASMA CUTTING TORCH

CROSS-REFERENCE TO RELATED APPLICATIONS

The present application is a continuation of U.S. patent application Ser. No. 15/442,424 filed Feb. 24, 2017, the disclosure of which is incorporated herein by reference.

BACKGROUND OF THE INVENTION

Field of the Invention

Systems and methods of the present invention relate to plasma cutting, and more specifically to a brazed electrode for arc plasma cutting.

Description of the Related Art

The use of plasma cutting systems in various industries has grown, and as a result there is an increasing need to increase the durability and longevity of torches and their components. This is particularly true with regarding to some internal torch parts, such as the electrode. As is generally known, plasma cutting involves the use of high current plasma jet which generates a large amount of heat during cutting and can generate spatter during piercing or arc starting. This high heat and spatter adversely affects the operational life of components in the torch, which then require replacement—causing downtime. Accordingly, improvements are needed which reduce this downtime and increase the operational life of torch components.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Embodiments of the present invention include a brazed electrode and methods of manufacturing a brazed electrode having a silver tip portion and copper body, where the silver is brazed to the copper body. The use of the silver improves the heat dissipation characteristics of the electrode and the brazing allows the composite electrode to be manufactured easily and have optimal heat dissipation characteristics.

BRIEF DESCRIPTION OF THE DRAWINGS

The above and/or other aspects of the invention will be more apparent by describing in detail exemplary embodiments of the invention with reference to the accompanying drawings, in which:

FIG. 2A is a diagrammatical representation of an initial stage of the manufacture of an exemplary electrode described herein; of an exemplary nozzle of the present invention;

FIG. 2B is a diagrammatical representation of an exemplary embodiment of a finished electrode as described herein;

DETAILED DESCRIPTION OF EXEMPLARY EMBODIMENTS

Figure 1:
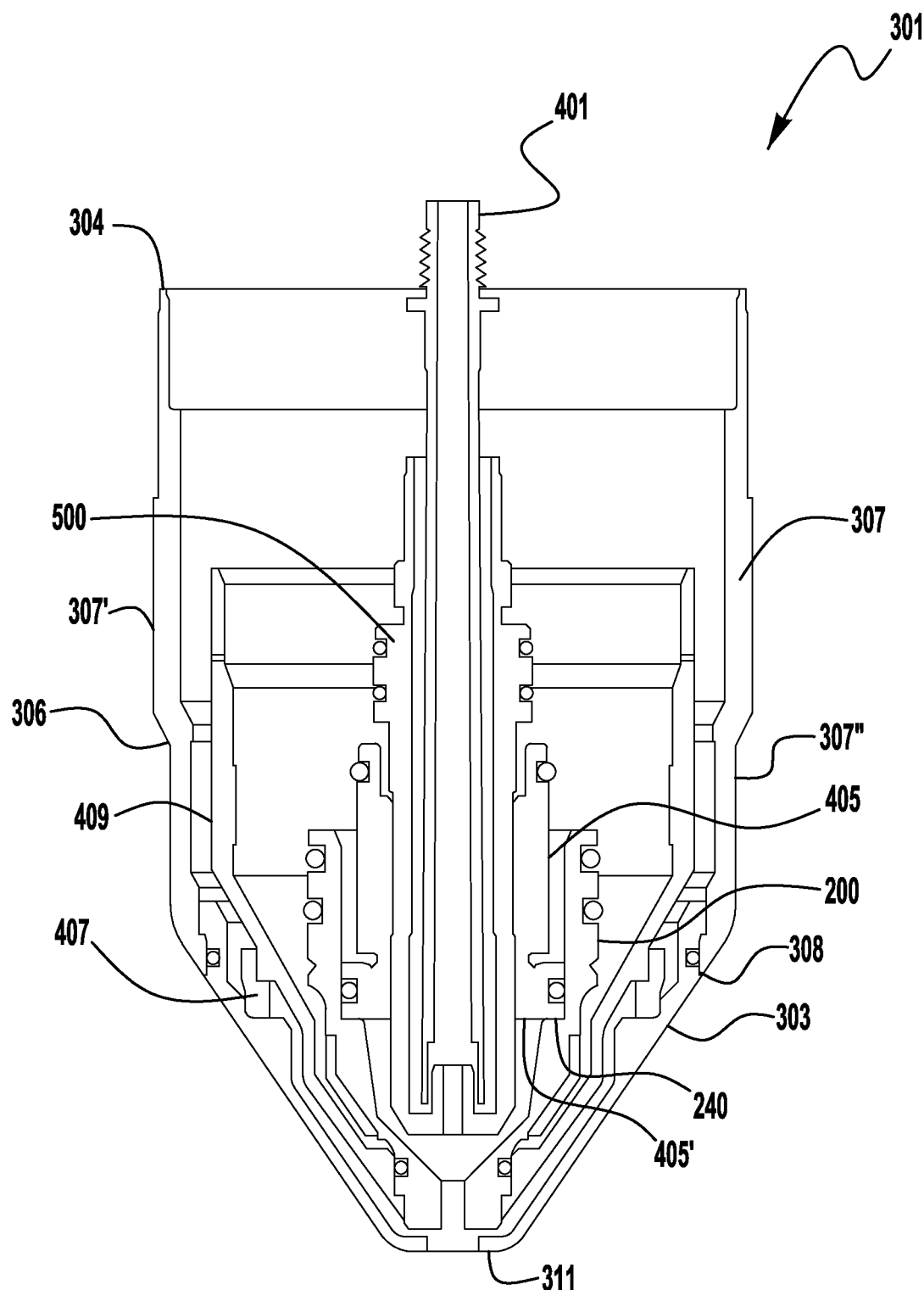
FIG. 1 is a diagrammatical representation of an exemplary embodiment of a torch head assembly which can utilize an electrode described herein.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It is noted that for purposes of the following discussion, the electrode embodiments discussed herein will be described as liquid cooled electrodes which can be used in mechanized plasma arc cutting systems. However, exemplary embodiments are not limited to being used in such arc cutting systems, and embodiments can be used in hand held cutting systems as well as air cooled systems. Thus, the following discussions are intended to be exemplary and informative. Further, discussions below will use terminology such as "distal" and "downstream". In the context of this application it is understood that these terms mean closer to the end of the torch from which the plasma is emitted. For example, the distal end of the torch is the end of the torch from which the plasma jet is emitted to perform cutting. Further, is something is "downstream" of another component, it is closer to the distal end of the torch. Similarly, the use of the term "upstream" will generally indicate that something is further away from the distal end of the torch.

Because the manufacture, assembly and use of arc cutting torches is generally known to those of skill in the art, the details of their assembly and components thereof will not be set forth herein.

Turning now to FIG. 1, FIG. 1 depicts a cross-section of an exemplary torch head 301 that can be used with embodiments of the present invention. As generally known, the torch head 301 has a shield cap 303, which is held in position by an outer retaining cap 307. Internal to the shield cap 303 is a nozzle 200 which is held into position with an inner retaining cap 409. Between the inner retaining cap 409 and the shield cap 303 is a shield gas swirler 407 which channels and imparts a flow on the shield gas being directed between the inner retainer cap 409 and the shield cap 303. Upstream of the nozzle 200 is an electrode 500 and cooling tube 401, both of which collectively are inserted into the cavity of the nozzle 200. The plasma arc is generated from the electrode 500 and the cooling tube 401 is used to direct a cooling fluid to the electrode 500 to keep it at an acceptable operating temperature. Between the electrode 500 and the nozzle 200 is a plasma gas swirl ring 405 which imparts a swirl flow on the plasma gas that aids in maintaining a stable arc during cutting and to cool the nozzle 200. The plasma gas swirl ring 405 has a distal end surface 405' which seats on an inner seating surface 240 of the nozzle 200.

Embodiments of the present invention are directed to the electrode 500, which will be described in more detail below.

It is generally known that the use of silver in plasma cutting electrodes can increase their cutting life. However, due to the cost of silver, electrodes using silver tend to be considerably shorter in length than the copper electrodes. Because of this users of these electrodes have to carry two different torch head assemblies, so that they can accommodate the use of silver and copper electrodes. Embodiments of the present invention obviate the need to accommodate two different electrode lengths by utilizing a composite silver-copper electrode, which achieves the benefits of the use of silver without the costs and size accommodations that need to be made with silver electrodes. The use of composite electrodes is also known, however, these electrodes are manufactured with very complex manufacturing processes such as thermal bonding or frictional welding. These processes are expensive and difficult to manufacture properly. Embodiments of the present invention alleviate these issues.

Turning now to FIG. 2A, an exemplary electrode 500' is shown in an uncompleted state. That is, the electrode 500' is shown prior to brazing and final machining which is explained further below. In exemplary embodiments of the present invention, the electrode 500' is comprised of a copper body portion 503' and a silver distal end portion 501' (or tip portion) where the copper body portion has a cavity 507' that is open on the upstream end of the body portion 503' and is open on the distal end such that a surface of the silver portion 501' interfaces with the cavity 507' as shown. The body portion has a wall which defines the cavity portion. This allows additional cooling of the silver 501' during operation. The distal end of the copper 503' has a shoulder portion or shoulder engagement portion 513 such that the silver 501' is inserted into the shoulder portion. That is, the diameter of the shoulder portion 513 in the body 503' is larger than that of the cavity 507'. Also, the portion 501' has a cavity or tip cavity 504 on its distal end face (which is its distal most surface) into which a hafnium insert or emissive insert 505' is to be inserted. Each of the shoulder 513 and the silver portion 501' are manufactured and configured such that the upstream most face/surface 510 of the silver portion 501' rests on/makes contact with the shoulder surface 511, which is a first surface of shoulder 513, as shown in FIG. 2A. These components rest onto each other such that there is no gap between the surfaces 510/511 when the components are assembled. However, when assembled together a gap G exists between a shoulder portion or shoulder engagement portion 515 of the silver portion 501' and the shoulder portion 513 of the copper. (As seen the shoulder portion 515 has a first surface 506 (FIG. 3A) which corresponds to the distal end surface of the body 503 and a second surface 508 (FIG. 3A) that extends upstream from the first surface to extend to the upstream most end 1510 of the tip portion and corresponds to a similar second surface 512 (FIG. 3A) on the shoulder portion 513 of the body portion 503.) This gap G extends along both the horizontal and vertical adjacent surfaces of the shoulder portions. This gap G exists to allow for proper brazing of the components. That is, as shown, extending from the upstream most surface 511 of the body 503 is a wall surface extending toward the distal end face 502 of the body portion 503'/503.

That is, during manufacture each of the copper and silver portions are assembled with each other as shown and described. The silver portion 501' is centered, as much as possible, relative to the copper portion 503' such that the gap G around the shoulder portions is generally even/symmetrical. It is not that in some embodiments the gap G distance for each of the horizontal and vertical faces can be the same. However, in other exemplary embodiments, the horizontal gap can be larger than or, in some embodiments, smaller than the vertical gap G. The gap geometries should be chosen to maximize structural integrity and brazing flow as discussed below. Further, as shown the silver portion 501' can be chamfered at the outer edge of the gap G to influence braze flow into the gap G.

Prior to the insertion of the hafnium insert 505' into the sliver 501' the silver and copper components are brazed to each other. This can be done using a silver braze, having silver as a primary component, and appropriate flux to ensure proper braze flow into the gaps G. The brazing can be done via known methods, such as an induction heater for example. The brazing operation should be accomplished such that the entirety of the gap G is filled with braze but that the contact surface 510/511 remain in contact with each other.

After the conclusion of the brazing operation, the hafnium insert 505' can be inserted into the cavity in the silver portion 501'. By insertion after brazing there is no risk of damaging or compromising the hafnium during the brazing operation. Once brazed and assembled the assembly 500 can be machined to its final dimensions as shown in FIG. 2B. Specifically, the outer surface of the assembly 500 are machined to achieve the final outside dimensions and shape of the electrode 500. Further, the cavity 507 is also machined as shown to the final diameter of the cavity. In some exemplary embodiments a cavity extension portion 517 (shaped liked an annulus) can be formed so as to increase the exposed surface area of the silver portion 501 of the electrode 500. When the final dimensions are achieved the assembly 500 provides an electrode with the performance of a silver electrode, but at a much reduced costs and the dimensions of a copper electrode.

Figure 3A:
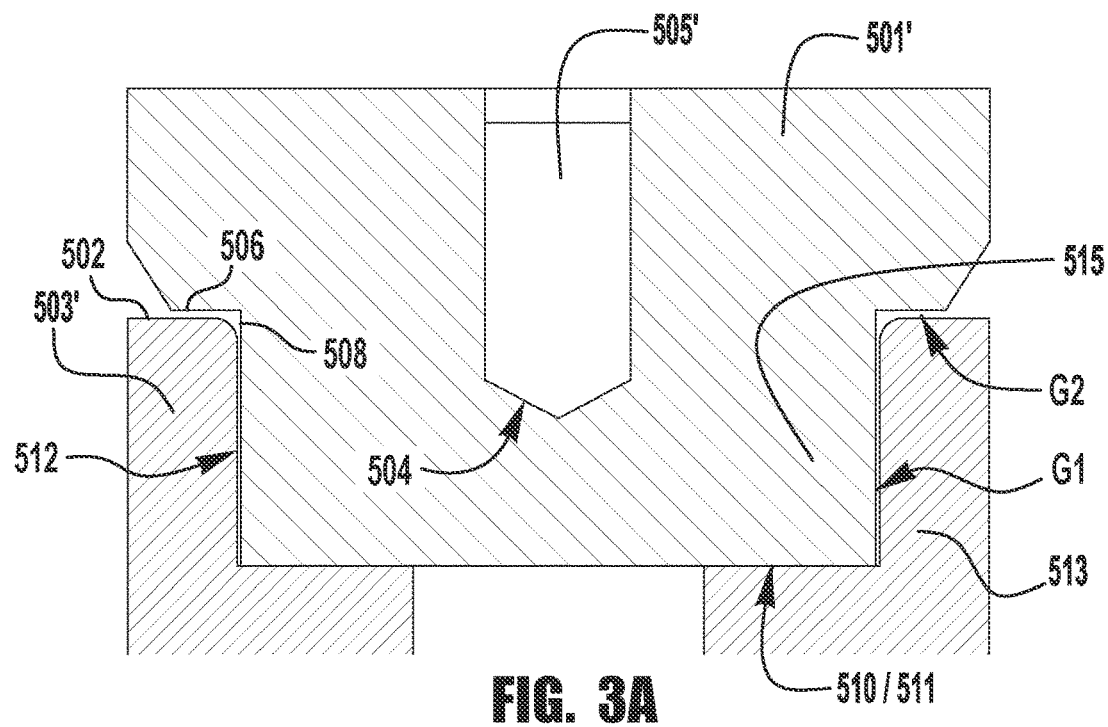
FIG. 3A is a diagrammatical representation of a cross-section of the initial stage electrode shown in FIG. 2A.

FIG. 3A is a close-up view of the assembly shown in FIG. 2A. As shown the surfaces 510/511 are in contact with each other, while the gap G (FIG. 2A) exists along both the vertical G1 and horizontal G2 portions, as shown in this Figure—in this embodiment the gap G2 along the horizontal portion is larger than the vertical gap G1. In some exemplary embodiments the average gap G2 on the horizontal surface is in the range of 0.001 to 0.006 in. Further, in exemplary embodiments the vertical gap G1 is in the range of 0.002 to 0.0035 in. In any event, the gap dimensions should be selected to promote proper brazing of the components. It is noted that while the surfaces of the shoulder portions of each of the tip and the body are shown horizontal and vertical, and meeting at a right angle, embodiments are not limited to this and the corners can be angled.

Figure 3B:
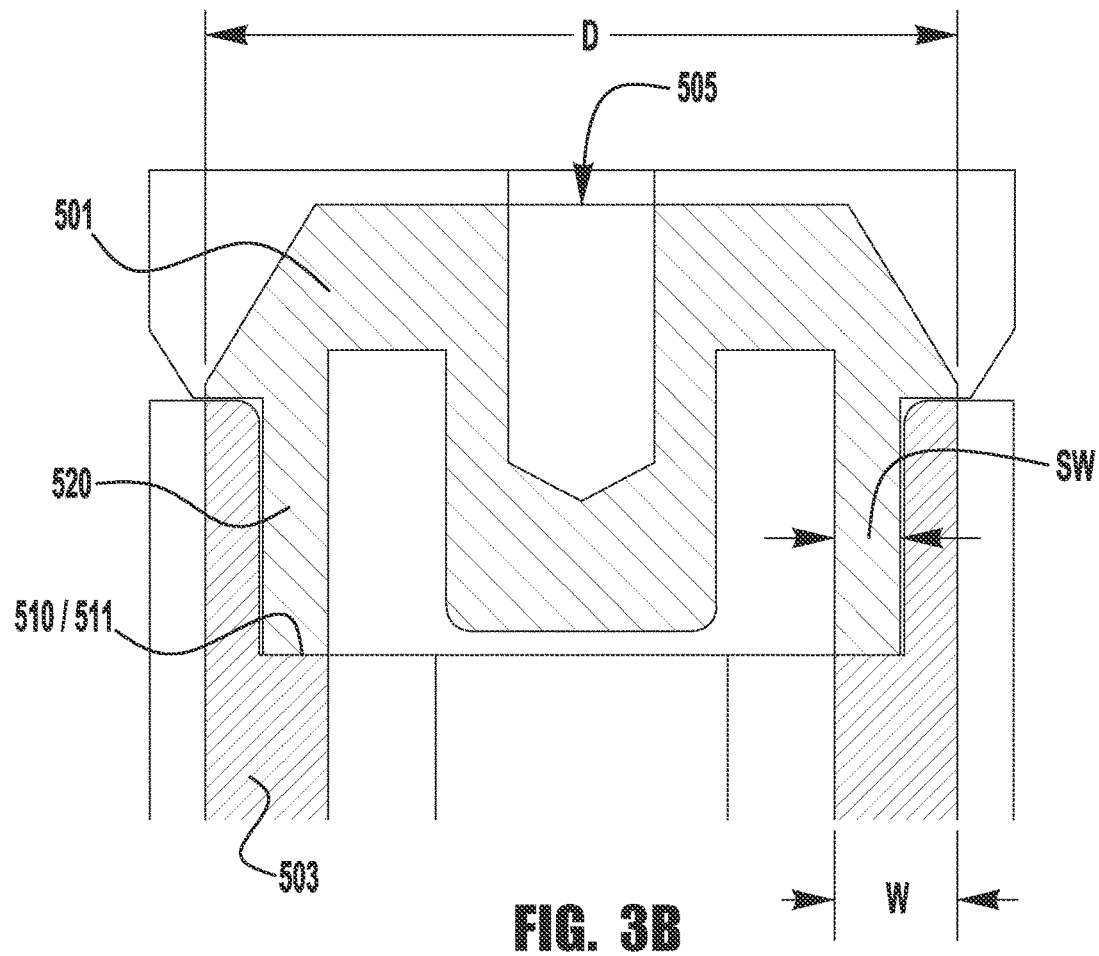
FIG. 3B is a diagrammatical representation of a cross-section of the finished electrode shown in FIG. 2B.

FIG. 3B depicts a close up view of the finished electrode 500 shown in FIG. 2B. As shown, the distal end of the finished electrode 500 has a maximum outer diameter D (which may not necessarily be the largest outer diameter of the electrode 500) and the copper portion has a wall thickness (adjacent to the cavity 507) of W. In exemplary embodiments, the wall thickness W is in the range of 10 to 40% of the diameter D, and in other embodiments, the wall thickness W is in the range of 14 to 25% of the diameter D. Additionally, the silver portion 501 has an insertion portion 520 as shown that is the portion inserted in the copper portion 503 as shown. In some embodiments, the insertion portion 520 has a wall thickness SW that is less than the thickness W. In exemplary embodiments, the wall thickness SW is in the range of 35 to 65% of the thickness W. Further, in exemplary embodiments, the insertion portion wall thickness 520 is in the range of 40 to 55% of the thickness W. With these ratios the thermal performance of the wall of the cavity 507 provides an optimal thermal performance, structural integrity, but at a manufacturing complexity and cost that is significantly improved over known solutions.

Figure 4:
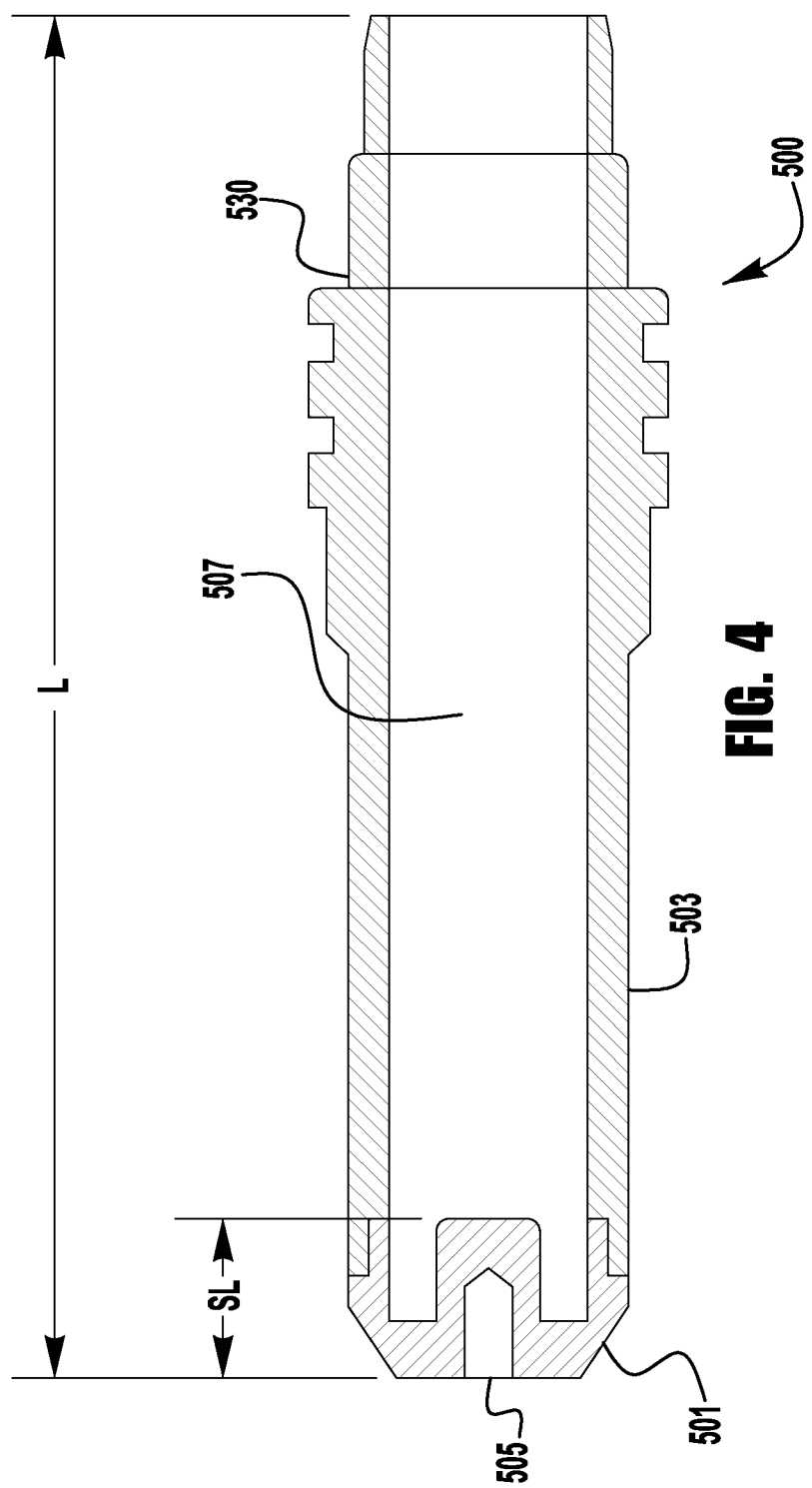
FIG. 4 is a diagrammatical representation a cross-section of a complete exemplary electrode described herein.

FIG. 4 depicts a cross-section of an exemplary electrode 500. While the upstream end 530 is depicted as shown, exemplary embodiments are not limited to this configuration and other configurations can be used without departing from the spirit or scope of the present invention. As shown, the electrode 500 has an overall length L—which includes the distal end face of the silver portion 501 and the upstream most end of the copper portion 503. The silver portion has a length SL that extends from its distal end face to its upstream most end, which is the end face of the insertion portion 520. In exemplary embodiments, the length SL is in the range of 10 to 20% of the overall length L. In other exemplary embodiments, the length SL is in the range of 12 to 17% of the length L. These ratios allow for desired thermal performance and maximize structural integrity of the assembly. For example, if the length of the silver portion 501 is too short the braze joint between the silver and copper will exist at a sufficient distance from the thermal gradients during cutting operations that the braze joints will not be thermally comprised during operation. If these joints are too close, overtime the braze joints can weaken and cause a failure of the assembly. Further, if the length is too long the structural integrity of the assembly can be compromised, and at a higher cost of manufacture and materials. For example, a longer silver length can result in less than desirable braze penetration during assembly, thus leaving gaps which can create thermal stress concentrations or otherwise adversely affect the thermal conductivity between components. Of course, minor deviations from the above ranges can be achieved depending on the configuration of the design, however, the above considerations must be considered to ensure proper, sustained operation. Particularly, the silver portion 501 should have a length sufficient to keep the majority, or all, of the braze joint out of the higher temperature gradients and bands that will be achieved during sustained cutting. It is acceptable for some portion of the joint to be in some of the temperature gradient bands, but the joints should not exist in the higher temperature gradient bands. Of course, this could also be affected by the brazing material used. In exemplary embodiments of the present invention, the maximum temperature experienced by the braze joint during torch operation is less than 235° C., and the temperature differential across the joint (between the adjacent materials) is no more than 50° C. Thus, embodiments of the present invention have a construction that optimizes the life of the electrode and optimizes its thermal effectiveness given its construction.

In view of the foregoing, embodiments of the present invention provide a high performance cutting electrode, that is easy to manufacture and at a cost point which is considerably improved over known silver and silver composite electrodes.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A composite plasma cutting electrode, comprising:
   a body portion made from a first material having a wall portion defining a cavity and a distal end having an distal end face and a first shoulder engagement portion which extends upstream from said distal end face, where said first shoulder engagement portion comprises first and second surfaces; and
   a tip portion made from a second material, said tip portion having a further distal end face and a tip cavity in said further distal end face with an emissive insert disposed in said tip cavity, an upstream end face, and a second shoulder engagement portion extending downstream from said upstream end face, and having a first and second surface,
   wherein said upstream end face of said tip portion makes direct physical contact with said first surface of said first shoulder engagement portion;
   wherein said second surface of said first shoulder engagement portion is adjacent to said second surface of said second shoulder engagement portion such that a first gap exists between said respective second surfaces,
   wherein said first surface of said second shoulder engagement portion is adjacent to said distal end face of said body portion such that a second gap exists between said first surface of said second shoulder engagement portion and said distal end face of said body portion, and
   wherein each of said first and second gaps are filled with a brazing material which secures said body portion to said tip portion.

2. The composite plasma cutting electrode of claim 1, wherein said second gap is in the range of 0.001 to 0.006 in.

3. The composite plasma cutting electrode of claim 2, wherein said first gap is in the range of 0.002 to 0.0035 in.

4. The composite plasma cutting electrode of claim 1, wherein said wall portion has a first thickness which is upstream of said first shoulder engagement portion and a second thickness which is downstream of said first surface of said first shoulder engagement portion, wherein said first thickness is greater than said second thickness.

5. The composite plasma cutting electrode of claim 1, wherein a wall thickness of said first shoulder engagement portion is different from a wall thickness of said second shoulder engagement portion.

6. The composite plasma cutting electrode of claim 1, wherein said first material is copper, said second material is silver and said brazing material contains silver.

7. The composite plasma cutting electrode of claim 1, wherein said composite plasma cutting electrode has an overall length L, and said tip portion has a length SL, where SL is in the range of 10 to 20% of L.

8. The composite plasma cutting electrode of claim 1, wherein said composite plasma cutting electrode has an overall length L, and said tip portion has a length SL, where SL is in the range of 12 to 17% of L.

9. The composite plasma cutting electrode of claim 1, wherein said first gap and said second gap have a same gap distance.

10. The composite plasma cutting electrode of claim 1, wherein said first gap and said second gap have differing gap distances.

11. A composite plasma cutting electrode, comprising:
    a copper body having a wall portion defining a cavity and a distal end having an distal end face and a first shoulder engagement portion which extends upstream from said distal end face, where said first shoulder engagement portion comprises first and second surfaces; and
    a silver tip, said silver tip having a further distal end face and a tip cavity in said further distal end face with an emissive insert disposed in said tip cavity, an upstream end face, and a second shoulder engagement portion extending downstream from said upstream end face, and having a first and second surface,
    wherein said upstream end face of said silver tip makes direct physical contact with said first surface of said first shoulder engagement portion;
    wherein said second surface of said first shoulder engagement portion is adjacent to said second surface of said second shoulder engagement portion such that a first gap exists between said respective second surfaces, wherein said first surface of said second shoulder engagement portion is adjacent to said distal end face of said copper body such that a second gap exists between said first surface of said second shoulder engagement portion and said distal end face of said copper body, and wherein each of said first and second gaps are filled with a brazing material which secures said copper body to said silver tip, wherein said second gap is larger than said first gap.

12. The composite plasma cutting electrode of claim 11, wherein said second gap is in a range of 0.001 to 0.006 in.

13. The composite plasma cutting electrode of claim 12, wherein said first gap is in a range of 0.002 to 0.0035 in.

14. The composite plasma cutting electrode of claim 11, wherein said wall portion has a first thickness which is upstream of said first shoulder engagement portion and a second thickness which is downstream of said first surface of said first shoulder engagement portion, wherein said first thickness is greater than said second thickness.

15. The composite plasma cutting electrode of claim 11, wherein a wall thickness of said first shoulder engagement portion is different than a wall thickness of said second shoulder engagement portion.

16. The composite plasma cutting electrode of claim 11, wherein brazing material contains silver.

17. The composite plasma cutting electrode of claim 11, wherein said composite plasma cutting electrode has an overall length L, and said silver tip has a length SL, wherein SL is in the range of 10 to 20% of L.

18. The composite plasma cutting electrode of claim 11, wherein said composite plasma cutting electrode has an overall length L, and said silver tip has a length SL, wherein SL is in the range of 12 to 17% of L.

* * * * *